United States Patent
Verner

[15] 3,688,073
[45] Aug. 29, 1972

[54] GAP SHORT CIRCUIT LIMITING SYSTEM FOR ELECTRICAL DISCHARGE MACHINING

[72] Inventor: Dalton R. Verner, Orchard Lake, Mich.

[73] Assignee: Klox Inc., Davidson, N.C.

[22] Filed: Feb. 1, 1971

[21] Appl. No.: 111,289

[52] U.S. Cl. ............................................... 219/69 C
[51] Int. Cl. ............................................... B23p 1/08
[58] Field of Search.........219/69 C, 69 G, 69 P, 69 S

[56] References Cited
UNITED STATES PATENTS

| | | | |
|---|---|---|---|
| 3,536,881 | 10/1970 | Inoue | 219/69 C |
| 3,588,428 | 6/1971 | Sennowitz | 219/69 P |
| 3,158,728 | 11/1964 | Webb | 219/69 P |

*Primary Examiner*—R. F. Staubly
*Attorney*—Hauke, Gifford and Patalidis

[57] ABSTRACT

A circuit is included to provide preselected gap cutting current limiting. A main machining DC source is derived from an AC source through a rectifier. A saturable reactor is connected between the AC source and rectifier to limit the maximum current that is available from the DC source. The control of the saturable reactor is maintained and regulated in accordance with the frequency at which the electrical discharge machining operation is being carried out.

7 Claims, 3 Drawing Figures

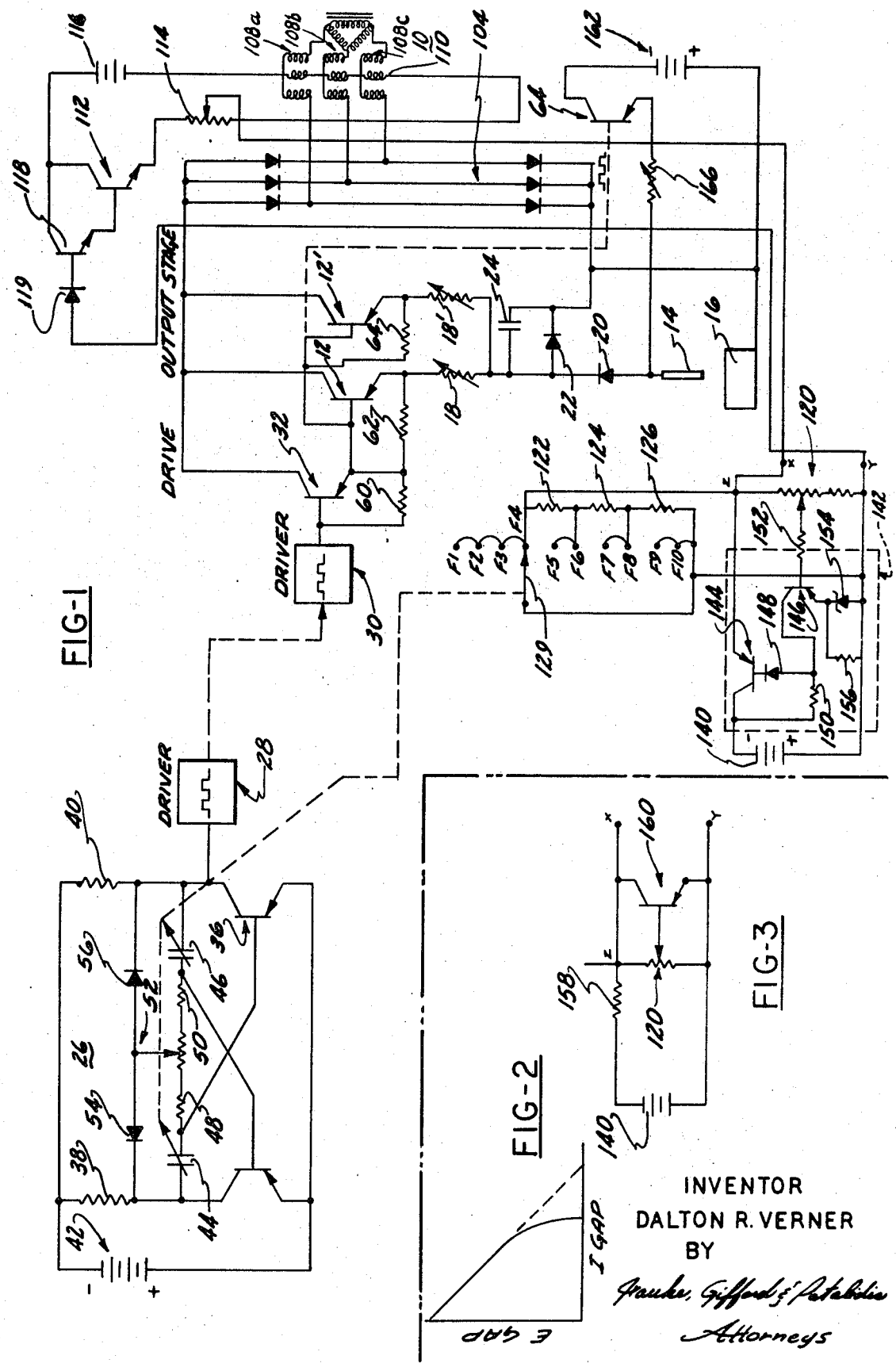

GAP SHORT CIRCUIT LIMITING SYSTEM FOR ELECTRICAL DISCHARGE MACHINING

BACKGROUND OF THE INVENTION

The field to which my invention relates is that known as electrical discharge machining in which process material is removed from an electrically conductive workpiece by the action of electrical gap discharges passing between a tool electrode and the workpiece. An electrode or workpiece servo feed system is used to provide relative movement to maintain an optimum gap spacing between the electrode and workpiece as material is removed. A dielectric coolant is circulated and recirculated through the gap during machining operation. For most reliable and predictable results, a power supply circuit of the independent pulser type is utilized to provide machining pulses of precisely controllable frequency and on-off time.

During the machining operation, the gap may become bridged by workpiece and electrode particles to cause a condition known as gap short circuit. This condition is accomplished by excessive localized heat which tends to damage both electrode and workpiece unless prompt correction action is taken. Various systems have been devised to provide fast-acting servo withdrawal or a somewhat limited interruption of current to the gap in which the interruption is initiated by impending or actual short circuit of the gap. Examples of these known systems are Kiyoshi Inoue U.S. Pat. No. 3,409,753 and U.S. Pat. No. Reissue 26,043, and Robert S. Webb U.S. Pat. No. 3,018,411. The current limiting system of the present invention is one which provides current limiting without the need for sensing or feedback circuits from the machining gap itself. My system operates to limit gap current and avoids the characteristic and damaging sudden gap current rise which otherwise might follow the occurrence of gap short circuit.

BRIEF DESCRIPTION OF THE DRAWINGS

FIG. 1 is a combined schematic and block diagrammatic showing of an electrical discharge machining power supply circuit with a short circuit current limiting system according to my invention incorporated therein;

FIG. 2 is a waveform diagram showing the gap current-gap voltage characteristic of the circuit of FIG. 1 with its current limiting system in operation; and FIG. 3 is a schematic drawing of an alternate form of voltage regulator for use in connection with the circuit of FIGURE 1.

DESCRIPTION

Referring now to the drawing of FIG. 1, the main machining power source 10 is shown connected with a pair of parallel-connected output stage transistors 12, 12'. The machining gap comprises a tool electrode 14 and a workpiece 16. The DC source 10 includes a three phase AC input through a transformer 101, the secondary winding of which is denoted by the numeral 102. A full wave rectifier 104 is connected in the circuit as shown with its individual rectifiers 106 coupled in the conventional manner. A saturable reactor 108a, b, c is connected in series in each AC phase as shown with a suitable AC winding for each. A control winding 110 for the saturable reactor is connected in series with the collector-emitter of a transistor 112, a variable resistor 114, and a DC source 116. A second transistor 118 is compound coupled in Darlington configuration to the transistor 112 as shown to provide current amplification. The flow of current through the collector-emitter of the transistor 112 and through the control winding 110 controls the degree of saturation and hence the secondary current in the saturable reactors 108a, b, c. The base of the transistor 118 is connected to the lower end of a potentiometer 120 through a diode 119. The variable resistor element of the potentiometer 120 is connected in series with a network including a plurality of series resistors 122, 124 and 126. A plurality of frequency tap switch 129 settings are associated with the above resistor network and are shown labeled as $F_1$ through $F_{10}$ which numbered tap switches represent capacitor settings for successively higher frequencies as will be explained in detail hereinafter. A DC source 140 is connected to potentiometer 120 through a voltage regulator 142 which regulator is of the negative feedback type. Included in the voltage regulator 142 are a pair of PNP transistors 144 and 146. Transistor 144 has a signal diode 148 and a resistor 150 connected across its collector-base junction. Transistor 146 has its base connected to the movable contact of potentiometer 120 through a resistor 152. A Zener reference diode 154 and shunt resistor 156 are connected as shown between the positive terminal of the DC source 140 and the emitter of the transistor 146. As the voltage on the base of the transistor 146 rises, it is rendered more conductive to provide increased plus signal to the base of the transistor 144. This tends to decrease the voltage output across the terminals X and Y.

Gap current magnitude is adjustable through a pair of series resistors 18, 18'. A rectifier 20 is included in series between the electrode 14 and the output stage transistors 12, 12' to permit high gap voltage operation without damage to these transistors. A diode 22 and a capacitor 24 are included to clamp transistors 12, 12' to the level of positive DC supply 10 to eliminate high voltage spikes.

Multivibrator stage 26 and driver stages 28, 30 and 32 are used to pulse the output stage transistors 12, 12'. In the interest of simplification, stages 28 and 30 have been shown in block form.

Included in multivibrator 26 are a pair of transistors 34, 36 biased and coupled for alternate operation in the astable multivibrator mode. The transistors 34 and 36 are connected respectively through load resistors 38 and 40 to the negative terminal of DC source 42. A pair of capacitors 44, 46 are adjustable in magnitude by an appropriate ganged control and cross-couple the collectors of the transistors 34, 36 each to the opposing transistor base. A pair of limiting resistors 48, 50 and a potentiometer 52 are included in the multivibrator circuit with the pulse on-off time, i.e. machining pulse width, controlled by the setting of the potentiometer 52. A pair of blocking diodes 54, 56 are connected as shown in circuit with the movable contact of the potentiometer 52. The frequency of the multivibrator 26 operation and hence the frequency of the machining power pulses furnished to the gap may be selectively altered by changing the values of the capacitors 44, 46 through a ganged switch as is indicated by the dash lines between those capacitors. A further dash line is shown between the capacitor 46 and the frequency tap switch 129 which switch provides for conjoint control of signal input for the transistor 118 along with the change of multivibrator operating frequency. The importance of this feature with respect to may gap current limiting system will be explained more fully hereinafter in the section "Description of Operation". The pulse output from the multivibrator 26 is suitably amplified and resquared through the intermediate drive stages 28, 30 and 32 to render the output transistors 12, 12' alternately conductive and non-conductive to provide machining pulses to the gap.

While the present invention employs transistors as electronic switches, the invention is not so limited but, with proper redesign of the circuit by one skilled in the art, any electronic switch may be substituted for those used in the circuit showing the present invention. By "electronic switch" is meant any electronic control device having three or more electrodes comprising at least two power or principal electrodes acting to control current flow in the power circuit, the conductivity of the power circuit being controlled by a control electrode within the switch, whereby the conductivity of the power circuit is controlled statically or electrically without movement of any mechanical elements within the switch. Included within this definition are electron tubes, transistors, and the like. With further reference to the drawing of FIG. 1, resistors 60, 62 and 64 are used to protect the base emitter junction of their respective transistors from excess turn-off voltage.

Also included in FIG. 1 is a circuit for providing superimposed high voltage pulses to the gap. This circuit is shown at the right hand end of the circuit diagram and includes a DC source 162 and a series connected transistor 164. A variable series resistor 166 is connected in series between the collector-emitter of the transistor 144 and the machining gap. The position terminal of DC source 162 is connected to the workpiece 16. The base of the transistor 164 is connected to the output of driver stage 32 so that transistor 164 is operated in phase with the first mentioned output transistor switches 12 and 12'.

FIG. 3 shows an alternate form of voltage regulator suitable for use in connection with the FIG. 1 circuit. The corresponding lettered terminals X, Y and Z show the connection points for incorporating the FIG. 3 voltage regulator in the circuit of FIG. 1. A resistor 158 is connected in series between the negative terminal of DC source 140 and point Z at the upper terminal of potentiometer 120. A transistor 160 is connected with its collector-emitter across the terminals of the potentiometer 120. As the voltage on the base of the transistor 160 rises, transistor 160 is rendered more conductive and reduces the voltage output from terminals X and Y.

DESCRIPTION OF OPERATION

The description of operation will now be made with special attention given to the current limiting system and its functioning. The multivibrator 26 is preset for rough machining through the setting of the potentiometer 52 to provide relatively high current, long on-time pulses of relatively low frequency. The on-time of the machining power pulses furnished to the gap is controlled through the conduction of the transistor 36, while off-time is controlled through the conduction of the transistor 34. Otherwise stated, the conduction of the multivibrator transistor 36 is in phase with the gap and the on-time operation of the output electronic switches 12, 12' and of the high voltage switch 164. During the roughing operation of the power supply, the control coil 110 of the saturable reactor 108 is rendered effective through the controlled conduction of the transistors 118 and 112. The conduction of transistor 112 provides a flow of energizing current from the positive terminal of the DC source 116 through the selectively preset resistor 114 and through the control coil 110 which coil has its three control windings each juxtaposed to a cooperative saturable reactor AC winding 108a, b, c. In order to turn on the transistors 118 and 112, a control signal is furnished to the base of the transistor 118, which signal is derived from the control voltage having its voltage network output from terminals X and Y.

A control signal is provided to render transistor 118 more conductive during low frequency operation of the power supply and less conductive during its high frequency operation. As has previously been indicated, the frequency of operation of the multivibrator 26 is controlled through the magnitude of the capacitors 44, 46 and through the setting of the associated ganged switch arrangement controlling their magnitude. An additional conjointly operable ganging arrangement is provided for the movable contact of the switch 129, which contact is shown in selected position on the $F_4$ tap. The present power supply includes ten frequency taps which may arrange typically from 500 $H_z$ to 250 $KH_z$. The lower frequency taps correspond to $F_1$ through $F_3$ in the present instance. As the movable contact of the switch 129 is moved downwardly through the higher frequency tap positions, the control signal to transistor 118 will be decreased. When the contact is moved to tap 4 and above, the decreased signal applied to the base of the transistor 118 will tend to render it and transistor 112 less conductive so that a greatly diminished quantity of energizing current is passed through the control coil 110 and the impedance of the saturable reactor 108 will be maintained relatively higher. The operation of the saturable reactor 108 in the circuit is illustrated in the waveform diagram of FIG. 2, which plots gap voltage, $E_{gap}$, against gap current, $I_{gap}$, and illustrates what happens during a short circuit condition of the gap. It will be seen that the short circuit, which occurs at the knee of the solid line curve, results in rapid reduction of gap voltage. Without the inclusion of the saturable reactor 108 as a current limiter in the circuit, the gap current would rise exceedingly rapidly along the dash line indicated. With the inclusion of the saturable reactor 108 and its control in the circuit, gap current is substantially limited to and does not rise beyond the level of current passing across the gap at the inception of the gap short circuit condition. This current limiting operation is exceedingly important since the servo system back-up normally employed in an EDM power supply cannot always be relied upon to increase gap spacing in time to prevent damage to the workpiece 16 and to the tool electrode 14. The current limiting action which is afforded by the circuit of the present invention provides and the degree of current limiting required until corrective servo operation can be completed.

I have also found that there is a considerable advantage to be derived from including in the circuit a superimposed machining voltage source such as is provided by transistor 164 and its associated DC source 162. The saturable reactor provides a predetermined current limit for the relatively low voltage, high current pulses from source 10. The somewhat higher voltage, lower current pulses from source 162 assist in facilitating gap breakdown and gap ionization.

It will thus be seen that I have provided by my circuit a current limiting system for EDM which is both novel and efficient to a degree not attained by the prior art. My invention is not limited to the preferred embodiment described above.

I claim:

1. In an electrical discharge machining apparatus including a tool electrode from removing material from an electrically conductive workpiece across a dielectric coolant filled gap, the combination comprising a DC source and a variable frequency, periodically operated electronic output switch operatively connected to said gap for providing machining power pulses thereto wherein said DC power source comprises an AC power source, a rectifier connected to said AC source, a means for presetting a limit for current to said gap comprising a saturable reactor means connected between said AC source and said rectifier, a control coil for said saturable reactor, an electronic control switch, a second DC switch connected in series with said control coil and said control switch, a means operatively connected to said electronic control switch for controlling the degree of saturation of said saturable reactor responsive to the predetermined frequency of operation of said electronic output switch, said electronic output switch having operatively connected to it a multivibrator of adjustable frequency for turning said electronic output switch on and off at selected frequency, said electronic control switch being rendered more conductive according to low frequency operation of said multivibrator.

2. The combination as set forth in claim 1 wherein said AC source comprises a plurality of input phases and wherein a separate rectifier and saturable reactor are included in series with each one of said phases.

3. The combination as set forth in claim 1 wherein said multivibrator is of the astable operating type including a pair of alternately conductive electronic switches having their respective control and principal electrodes cross-coupled and wherein a plurality of different magnitude capacitors and a selector switch therefor are included to provide different frequency operation of said multivibrator, said selector switch being ganged in its operation and operatively connected to said control electronic switch for decreasing its conduction responsive to relatively high frequency settings of said multivibrator.

4. In an electrical discharge machining apparatus including a tool electrode for removing material from an electrically conductive workpiece across the dielectric coolant filled gap, the combination comprising a first relatively low voltage, high current DC source and a first periodically operated electronic output switch operatively connected between said first source and said gap for providing machining power pulses thereto, a current limiting means for presetting a limit for the magnitude of cutting current passed from said first DC source to said gap, a second periodically operated electronic output switch rendered conductive in phase with said first electronic output switch, a second DC source of relatively higher voltage and lower current than said first source connected in series with said second switch and said gap to provide higher voltage machining power pulses thereto, said first DC power source comprising an AC power source and a rectifier, said current limiting means comprising a saturable reactor means operatively connected between said AC power source and said rectifier, said saturable reactor means further including a control coil, an electronic control switch, and a separate DC source connected in series with said control coil and the principal electrodes of said control switch, said electronic control switch further comprising a pair of transistors connected in compound configuration with their conduction selectively presettable to control the degree of saturation of said saturable reactor.

5. The combination as set forth in claim 4 wherein said first DC source includes multiple phase AC inputs and rectifiers and wherein said current limiting means comprises a separate saturable reactor connected in each of said phases.

6. The combination as set forth in claim 5 wherein a pulser is included for rendering said first and said second electronic output switch conductive together, said pulser comprising a multivibrator including a variable capacitor switch for selectively changing its frequency of operation, wherein a control coil is operably connected to each of said saturable reactors and wherein a means is operatively connected between said variable capacitor switch and said control coil for limiting the degree of saturation of said reactors responsive to the frequency of said multivibrator.

7. The combination as set forth in claim 6 wherein the degree of saturation of said saturable reactors is maintained at a minimum and, accordingly, said cutting current is maintained at a minimum during relatively high frequency operation.

* * * * *

UNITED STATES PATENT OFFICE
CERTIFICATE OF CORRECTION

Patent No. 3,688,073     Dated  August 29, 1972

Inventor(s)    Dalton R. Verner

It is certified that error appears in the above-identified patent and that said Letters Patent are hereby corrected as shown below:

"Assignee: Klox Inc.," should read
--Assignee: Colt Industries Operating Corp., New York, N.Y., a corp. of Delaware. --

Column 3, line 6, change "may" to --my--.

Signed and sealed this 8th day of May 1973.

(SEAL)
Attest:

EDWARD M. FLETCHER, JR.
Attesting Officer

ROBERT GOTTSCHALK
Commissioner of Patents